J. W. WEST.
MACHINERY FOR SPOOLING THREAD OR YARN.
No. 181,885. Patented Sept. 5, 1876.
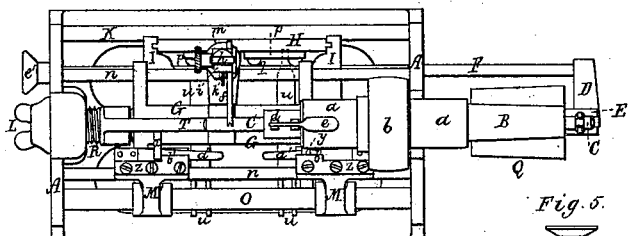
Fig. 1.
Fig. 5.
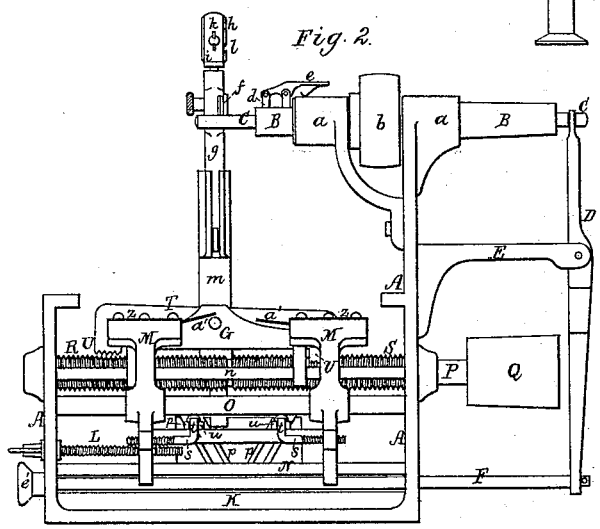
Fig. 2.
Fig. 3.
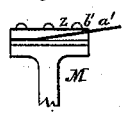
Fig. 7.
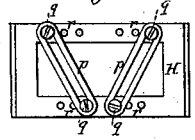
Fig. 6.
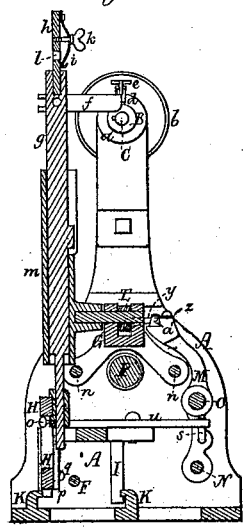
Fig. 4.
Witnesses.
S. W. Piper
J. R. Snow
John W. West,
by his attorney.
R. H. Eddy

UNITED STATES PATENT OFFICE.

JOHN W. WEST, OF BOSTON, MASSACHUSETTS.

IMPROVEMENT IN MACHINERY FOR SPOOLING THREAD OR YARN.

Specification forming part of Letters Patent No. 181,885, dated September 5, 1876; application filed March 10, 1876.

*To all whom it may concern:*

Be it known that I, JOHN W. WEST, of Boston, of the county of Suffolk and State of Massachusetts, have invented a new and useful Improvement in Machinery for Spooling Thread or Yarn; and I do hereby declare the same to be fully described in the following specification and represented in the accompanying drawings, of which—

Figure 1 is a top view, Fig. 2 a front elevation, Fig. 3 a longitudinal section, and Fig. 4 a transverse section, of a machine embodying my invention.

In such drawings, A denotes the frame of the machine, as provided with a tubular rotary arbor, B, arranged in bearings *a a*, and furnished with a band-pulley, *b*, which is for effecting the revolutions of said arbor. Extending through the arbor is a spindle or shaft, C, that slides lengthwise in the arbor, projects from it, as shown, and should or may be connected therewith by a spline or feather-connection, whereby it will be revolved with the arbor, though capable of being moved longitudinally within it. A bolt, *d*, extending transversely through the arbor and into the shaft C, and jointed to a lever, *e*, pivoted to the arbor, serves to hold the said shaft C from being moved backward within the arbor, while a spool may be on that portion of the said shaft C that may project from and out of the inner end of the said arbor. Furthermore, the shaft C, near its outer end, has a groove cut around it to receive the prongs of a furcated lever, D, pivoted to an arm, E. The said lever D, at its lower part, is jointed to a slide-rod, F, extending through the frame A, and provided with a knob, *e'*, all being as shown.

By means of the said slide-rod F and lever D the shaft C may be retracted or drawn back within the arbor, in order to discharge a spool from the shaft after such spool may have been wound with thread.

A notched guide, *f*, projecting from a vertical slide-rod, *g*, extends over the shaft C. At the top of the said rod is a perforated guide, *h*, provided with a tension-spring, *i*, and screw *k*, arranged as shown.

If we suppose a spool formed as represented in side view in Fig. 5 to be placed concentrically and tightly upon the shaft C, the yarn or thread to be wound on such spool will be conducted through the guide-hole *l*; thence down between the guide *h* and the tension-spring; thence to the outer end of the guide *f*, and through its notch to the barrel of the spool.

The rod *g* extends down through a guiding and supporting standard, *m*, fixed to a carriage, G, supported by, and so as to be capable of sliding longitudinally upon, two stationary and parallel rods, *n n*, arranged within the frame A, in manner as shown. At its lower part the rod *g* is fastened, by a clamp-screw, *o*, in and to a sleeve notched and adapted to slide lengthwise on the upper bar of a rectangular frame, H, arranged to slide vertically in another carriage, I, which, in turn, is supported upon parallel rails K K, so as to admit of it being moved lengthwise by an adjusting-screw, L, pivoted in the frame A, and screwed into said carriage I.

The rod *g*, with the sleeve, when in operation, has a reciprocating movement relatively to the frame H. The object of the screw L is to properly adjust the mechanism for spools of different lengths.

There are applied to the frame H two slotted guides or bars, *p p*, (see Fig. 6, which is a front view of such frame and bars,) the latter near their ends being conjoined to the opposite horizontal bars of the frame by clamp-screws *q q q q*. Each of the said bars of the said frame H has in it two series of screw-holes, *r*, in order to enable the guides *p p* to be arranged at different distances apart or inclinations, as may be desirable or necessary for varying the traverse of the poppets M M, which, formed and arranged as shown, are supported on two horizontal guide-rods, N O, extending lengthwise across the frame A.

To each of the said poppets there is a screw, *s*, that screws horizontally through the poppet. Near its inner end the shank of the screw is bent up, as shown at *t*, and into a notch in the front end of one of two levers, *u u*, arranged as shown, and pivoted on and to the carriage I, the tails or rear arms of such levers being cylindrical, and inserted in the grooves of the guides *p p*.

Extending lengthwise through the frame A is a shaft, P, which has its journal-bearings in the end parts of the frame, such shaft being provided with a band-pulley, Q, for revolving it. On this shaft and within the frame A, as shown, there are fixed two screws, R S, the threads of one being pitched in a direction opposite to those of the other, or, in other words, one is a right and the other a left screw. Over these screws, and pivoted at its middle to a carriage, G, is a lever, T, having female screw-threaded projections U U at its ends, to engage with the screws. From the arms of this lever two fingers, $x\ y$, extend, as shown, toward the poppets M M. Each of the said poppets is provided on its top with a plate, $z$, and a spring, $a'$, formed and arranged as represented, especially in Fig. 7, which is an inner side view of the upper part of one of the poppets.

While one of the fingers $x\ y$ is above and upon the portion $b'$ of its notched plate $z$, the other is below the other projection $b'$, and the projection U, next to the latter, is in engagement with its male screw, the other projection U being out of engagement with its own screw.

In the operation of the machine, the lever T is first tipped one way, to carry one projection, U, in connection with its male screw, and next it is tipped the other way, so as to carry the other projection into engagement with its own male screw. While one projection is in engagement with its screw, and both screws are in revolution, the carriage G will be moved in one direction, so as to cause the thread to be distributed from one head to the other of the spool, for the purpose of being laid on the spool while it may be in revolution. The alternate tippings of the lever T are effected by the springs $a'$. As the fingers $x\ y$ simultaneously pass beyond the projections $b'\ b'$ in going in either direction, one finger being below and the other above its projection $b'$, the finger that may have then passed along underneath one projection will be acted on and raised by the spring below it, so as to tip the lever in a manner to force the other finger down upon its actuating-spring and below the next adjacent projection $b'$.

The notched guide $f$ is to rest directly upon the barrel or load of the spool, in order that, as such load may increase in diameter, the guide $f$ may be forced upward, in order to effect, through the rod $g$, a similar elevation of the frame H. As the said frame H is raised up, its slotted guides $p\ p$ will so act upon the levers $u\ u$ as to move them in a manner to cause the two poppets to be simultaneously moved away from each other, thereby causing the traverse of the thread on the spool or yarn load to be increased. The screws $s\ s$ are to enable the poppets to be adjusted to the levers $u\ u$, as occasion may require.

From the above, it will be seen that a spool, when placed on the shaft C, may have a load wound upon it and have each layer of the load increased in width, from the first to the last one of such layers. Also, that after a spool may have been so wound it has not to be pulled off the shaft, but may be readily discharged from it by simply retracting the latter by means of the lever D and the rod F.

The mechanism may be adjusted to form spool-loads differing in form and length, and whether on either single-headed or double-headed spools, or on a spool or bobbin without heads.

Having thus described my improved machine for spooling thread, what I claim, then, as of my invention is as follows:

1. The arbor B, provided with the retractive spindle C and the stop-bolt $d$ therefor.

2. The frame H, provided with the series of adjusting-holes in its upper and lower bars, in combination with the slotted bars $p\ p$, the levers $u\ u$, and the guide $f$, and applied to them, substantially as specified.

3. The separate movable poppets M M and the connections $s\ s$, in combination with the levers $u\ u$ and their operative slotted bars $p\ p$, as described, all being arranged and applied as set forth.

4. The combination of the movable and adjustable carriage I, the levers $u\ u$, connections $s\ s$, poppets M M, frame H, and slotted bars $p\ p$, all being substantially as specified.

5. The machine or combination, substantially as described, composed of the rotary arbor B, for carrying the spool, the thread-guide $f$, lifter-rod $g$, frame H, slotted bars $p\ p$, levers $u\ u$, movable and adjustable carriage I, screw-connections $s\ s$, poppets M M, notched plates $z\ z$, springs $a'\ a'$, fingers $x\ y$, rocker lever T, carriage G, screw-threaded projections U U, and right and left screws R S, all arranged, supported, and applied in manner, and to a frame, A, substantially as specified.

JOHN W. WEST.

Witnesses:
R. H. EDDY,
J. R. SNOW.